No. 818,059. PATENTED APR. 17, 1906.
E. E., J. O. & J. A. THOMPSON.
INSECT EXTERMINATOR.
APPLICATION FILED OCT. 14, 1904.
3 SHEETS—SHEET 3.
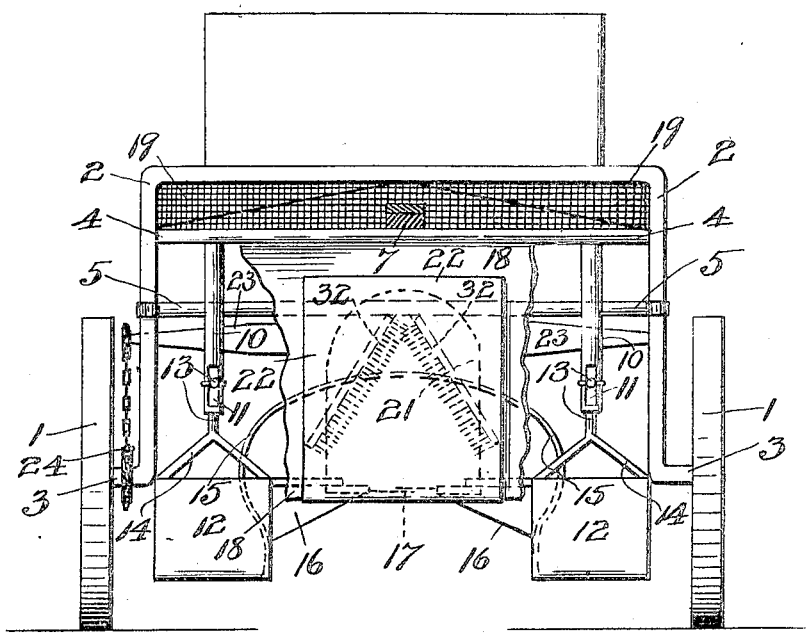
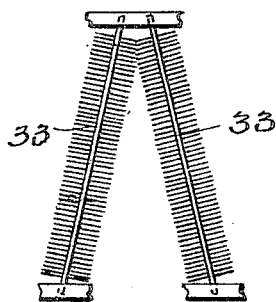
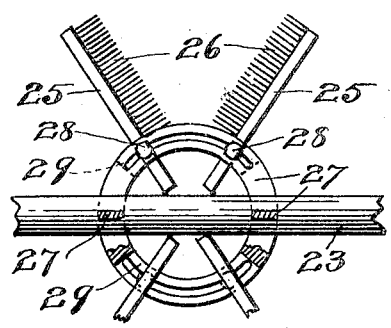
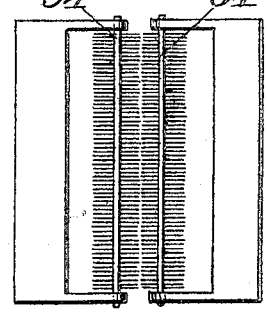

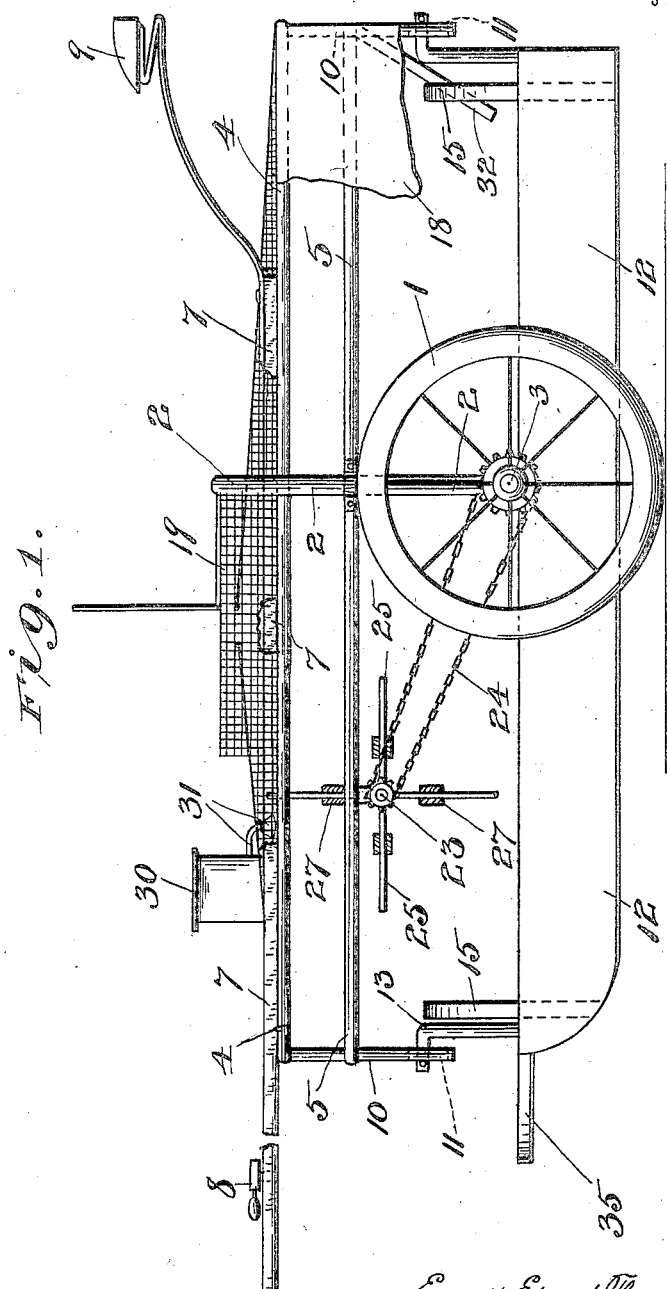

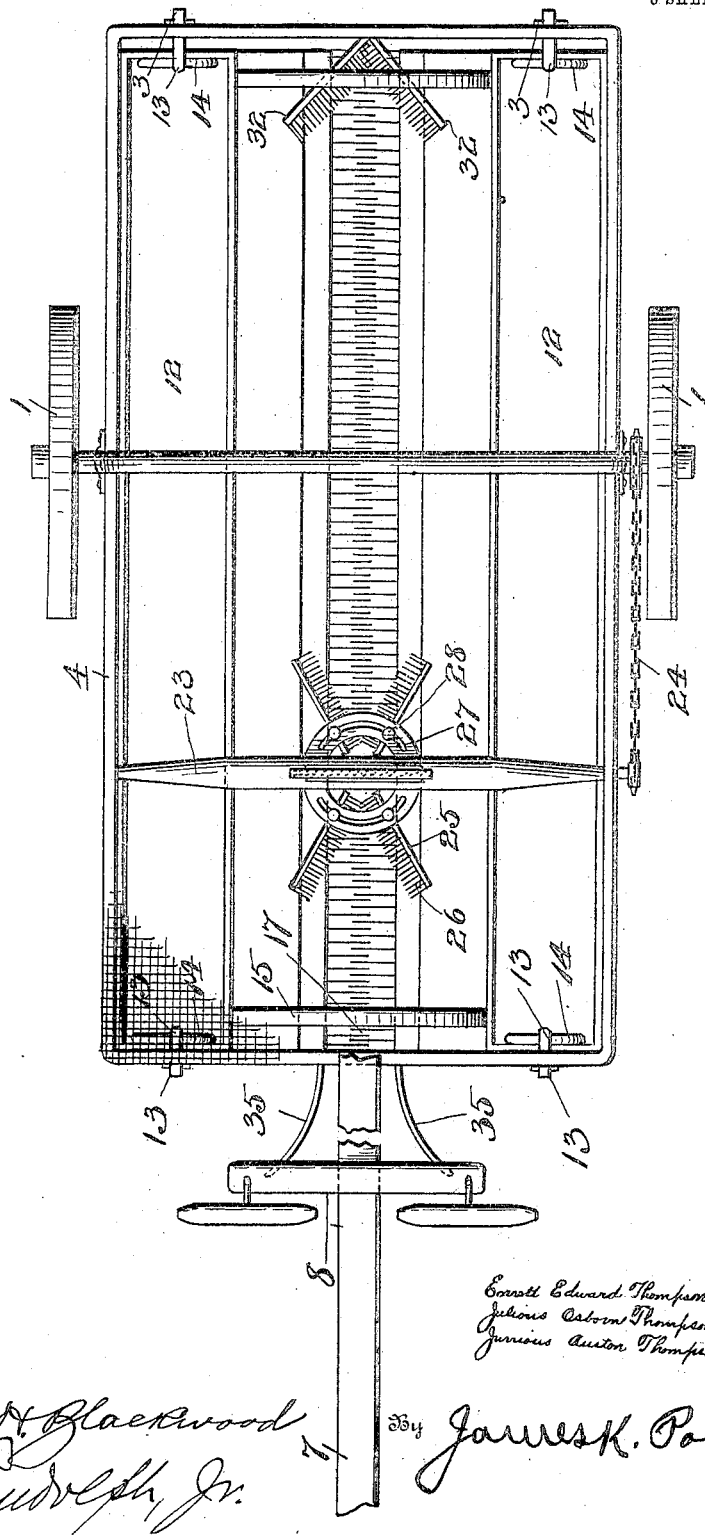

UNITED STATES PATENT OFFICE.

EVERETT EDWARD THOMPSON, JULIUS OSBORN THOMPSON, AND JUNIOUS AUSTON THOMPSON, OF KAUFMAN, TEXAS.

INSECT-EXTERMINATOR.

No. 818,059.　　Specification of Letters Patent.　　Patented April 17, 1906.

Application filed October 14, 1904. Serial No. 228,430.

*To all whom it may concern:*

Be it known that we, EVERETT EDWARD THOMPSON, JULIUS OSBORN THOMPSON, and JUNIOUS AUSTON THOMPSON, citizens of the United States, residing at Kaufman, in the county of Kaufman and State of Texas, have invented certain new and useful Improvements in Insect-Exterminators, of which the following is a specification.

Our invention relates to machines for catching and killing insects that are the foe of plant life, such as the potato-bug, the boll-weevil, &c.; and it has for its object the provision of a machine that is intended to be transported through the field of growing potatoes, cotton, &c., and to separate the insects from the plants and to kill the insects.

The construction and advantages of our invention will be explained at length hereinafter and are illustrated in the accompanying drawings, in which—

Figure 1 is a side view, in elevation, of our improved insect-exterminator, showing the gauze covering partially broken away to show the draft-pole; Fig. 2, a top plan view; Fig. 3, an end view; Fig. 4, a detail view of the dislodging-reel; Fig. 5, a view of a modification of the means for dislodging the insects; and Fig. 6, a view of a modification of the tank edges.

In the drawings similar reference characters indicate corresponding parts throughout the several views.

1 represents the traction-wheels, which are connected by an arch 2, provided with axles 3, on which the wheels 1 are journaled.

4 and 5 represent two rectangular frames secured to the arch 2, the upper frame 4 having the draft-pole 7 secured thereto and provided with suitable double and swingle trees 8 for draft-animals.

9 represents a seat for the driver, secured to the rear end of the draft-pole 7. At each end of the frames 4 and 5 are secured vertical poles 10, having slots 11 therein.

12 represents tanks or pans supported by means of angular rods 13, mounted in the slots 11, and secured to the pans 12 by means of forked bars 14.

15 represents arch-shaped springs secured to pans 12 to permit the pans to spread apart when passing a plant having a thick stalk or when the rows of plants are not in exact alinement, it being also understood that by supporting the pans in slotted poles 10 provision is made for a vertical movement of the pans in passing over uneven ground or avoiding stones or other obstructions, it being understood that the sidewise movement permitted by the springs 15 also contributes to this feature of the machine. The inner sides of the pans are formed with a decidedly abrupt slant, as shown at 16, so as to insure that any insect that strikes it will descend into the pan, the bottom of which will contain petroleum or other volatile oil to kill the insect. The edges of inner sides 16 of the pans are provided with stiff bristles 17, that extend across the space between the sides 16, said bristles being displaced as the stalk of the plant goes through, but preventing insects from falling to the ground.

The sides and ends of the machine are covered with a suitable fabric 18, such as duck, while the top is covered by wire-gauze formed in a conical shape with a hole at the apex leading into a trap 19 on the top of the machine made of wire-gauze, this construction being intended to catch and retain any winged insects that might be on the plant. The fabric on the front of the machine must be provided with an opening (not shown) to admit the plant, while another opening 21 is provided in the fabric on the rear of the machine, said opening 21 being covered by a hood or curtain 22, that normally covers said opening, but permits the egress of the plant and also serves to remove any insects that might still remain on the plants.

23 represents a shaft journaled on the side forward of the arch 2 and rods of frame 5 and driven by chain-and-sprocket gearing 24.

25 represents arms pivotally mounted on shaft 23 in pairs and having brush-faces 26 on their adjacent edges.

27 represents circular guides secured to the shaft 23 and having slots in which the arms 25 are mounted, said arms being adapted to be secured at any desired angle to one another by means of screw-threaded bolts and thumb-nuts 28, mounted in circular slots 29 in the tops of said guides 27.

30 represents a tank for containing petroleum or other insecticide, and it is provided with a spray 31, that plays on the brush-faces 26 as they revolve, so that the insecticide is carried to the foliage of the plants and distributed on their leaves.

At the rear of the machine just inside of the exit-opening 21 are provided arms 32, provided with brush-faces and secured so as to form an inverted V, that are intended to dislodge any insects that might have withstood the action of the reel formed by shaft 23 and arms 25.

In the modification shown in Fig. 5 instead of the reel above described there are provided two shafts 33, having brush-bristles secured thereto, that are journaled in such a manner and provided with gearing connected with the traction-wheels 1 so that same causes them to rotate and dislodge the insects. The modification shown in Fig. 6 is designed to replace the brush-faces 17 on the edges of the pans 12, and consists of shafts 34, journaled at each end of the pan and covered with brush-faces, said shafts being rotated by suitable gearing. (Not shown.)

35 represents arms secured to the front of each pan 12 and curved outwardly in the shape of a V to guide the stalks of the plants between the pans.

Having thus described our invention, what we claim as new is—

1. In an insect-destroyer, a horizontal axle suitably journaled and driven, brushes pivotally secured to said axle and arranged in pairs, and means to adjust said brushes relative to one another, substantially as shown and described.

2. In an insect-destroyer, a reel consisting of a series of brushes arranged in pairs and pivotally mounted on a common spindle to brush the foliage of growing plants, means to adjust said brushes relative to one another, and means to convey an insecticide to said reel, substantially as shown and described.

3. In an insect-destroyer, a horizontal axle suitably journaled and driven, brushes pivotally secured to said axle in pairs, curved and grooved guides secured to said axle, means to secure said brushes to said guides, a tank to contain an insecticide, and a spray connected to said tank and arranged to distribute the insecticide on said reel, substantially as shown and described.

4. In an insect-exterminator, pans adapted to pass on each side of rows of growing plants, said pans being held in a yielding position and adapted to move horizontally and vertically, and means to dislodge insects from said plants and cause them to drop into said pans, substantially as shown and described.

5. In an insect-exterminator, a wheeled frame, pans supported by said frame and held in a yielding position being adapted to move horizontally and vertically, and rotating brushes mounted on said frame, substantially as shown and described.

6. In an insect-exterminator, a wheeled frame, slotted posts on said frame, pans supported by said slotted posts and connected by arch-shaped springs, said frame being covered by suitable fabric, and means to dislodge insects into said pans, substantially as shown and described.

7. In an insect-exterminator, a wheeled frame, pans supported by said frame and adapted to pass on each side of a row of growing plants, the sides of said pans toward the row being slanting, and brush-faces secured to the adjacent edges of said pans, substantially as shown and described.

8. In an insect-exterminator, a wheeled frame, slotted posts secured to said frame, pans mounted in the slots in said posts, arch-shaped springs connecting said pans, said pans adapted to pass on opposite sides of a row of growing plants, and having the sides toward the row formed with an abrupt slant, brush-faces secured to the adjacent edges of said pans, a reel journaled on said frame and geared to the traction-wheels, a tank for supplying an insecticide to said reel, the sides of said frame covered with a suitable fabric, the top formed conical in shape and having an opening in its apex, and a trap covering said opening, substantially as shown and described.

In testimony whereof we have signed our names to this specification in the presence of two subscribing witnesses.

EVERETT EDWARD THOMPSON.
JULIUS OSBORN THOMPSON.
JUNIOUS AUSTON THOMPSON.

Witnesses:
R. H. MATHEWS,
J. W. BURTON.